No. 697,250. Patented Apr. 8, 1902.
E. B. HESS.
WRITING MACHINE.
(Application filed Dec. 30, 1901.)
(No Model.) 5 Sheets—Sheet 1.

Witnesses
Edward B Hess, Inventor
By his Attorneys

No. 697,250. Patented Apr. 8, 1902.
E. B. HESS.
WRITING MACHINE.
(Application filed Dec. 30, 1901.)
(No Model.) 5 Sheets—Sheet 3.

Witnesses
L. F. Browning
W. A. Stattlin

Inventor
Edward B. Hess
By his Attorneys
Baldwin, Davidson & Wight

No. 697,250. Patented Apr. 8, 1902.
E. B. HESS.
WRITING MACHINE.
(Application filed Dec. 30, 1901.)
(No Model.) 5 Sheets—Sheet 4.

Witnesses
Inventor
Edward B. Hess
By his Attorneys

UNITED STATES PATENT OFFICE.

EDWARD B. HESS, OF BROOKLYN, NEW YORK, ASSIGNOR TO MECHANICAL IMPROVEMENTS COMPANY, OF NEW YORK, N. Y., A CORPORATION OF NEW YORK.

WRITING-MACHINE.

SPECIFICATION forming part of Letters Patent No. 697,250, dated April 8, 1902.

Application filed December 30, 1901. Serial No. 87,707. (No model.)

*To all whom it may concern:*

Be it known that I, EDWARD B. HESS, a citizen of the United States of America, residing in the borough of Brooklyn, city of New York, State of New York, have invented certain new and useful Improvements in Writing-Machines, of which the following is a specification.

The primary feature of this invention resides in a new organization of type-bar movement or actuating devices wherein the type-bars are locked in their normal position of rest, so that having returned from the platen to such position they are prevented from rebounding and cannot, therefore, collide or interfere with other type-bars during the excursion of the latter to and from the printing-point.

The invention comprises other minor features of construction, all as hereinafter set forth and claimed.

I am aware that organizations have heretofore been proposed wherein the type-bars are locked in the normal position of rest by the action or behavior of the devices by means of which their excursion to the printing-point is effected. For instance, in the United States Patent of Huth, No. 525,345, dated September 4, 1894, the type-bar is locked when in its position of rest by means of a link 10, which, however, when actuated on the depression of the finger-piece and key-lever permits and effects the movement of the type-bar to the printing-point.

I am also aware of the patents to Stickney, Nos. 686,486 and 686,487, respectively, dated November 12, 1901, wherein the type-bars are actuated by vertically-disposed levers below which are arranged horizontal key-levers. Horizontal links connect the vertical levers with posts or projections extending vertically from the key-levers. Such mechanism performs the dual function of, on the depression of a key-lever, throwing the type-bar to the printing-point and locking the type-bar in the normal position of rest, any tendency of the bar to rebound from its back-stop being resisted by the compression strain on the horizontally-disposed link, the abutment which finally sustains such strain being the pivot upon which the key-lever rocks.

This invention is radically different from the structures disclosed in the above-mentioned patents. Briefly, it is as follows: Each type-bar is actuated by devices interposed between a fixed point or stationary axis and the heel of the type-bar. Provision is made for preventing movement of these devices in the direction in which the strain due to the tendency of the type-bar to move from its back-stop tends to actuate them, while they are free to move in another direction in response to the strain or power applied thereto on the depression of the corresponding finger-piece. Such devices interposed between the fixed axis and type-bar are independent of the key-lever or other device by which they are actuated on the depression of the finger-piece. In the form in which the invention is shown embodied in the accompanying drawings, which is specifically important and is the best form now known to me, each type-bar is actuated by two members arranged substantially end to end and connected by a flexing joint. The rear end of one member is connected to the type-bar and the other member rocks about a fixed point or stationary axis. The two members constitute what may be termed a "flexing connection," extending between the type-bar and the fixed point. By flexing the connection at its hinge-joint the angular relation of the two members is changed, and obviously the rear member or link will move toward the fixed point. To effect the excursion of the type-bar to the printing-point, any appropriate means of causing power applied to the finger-piece to produce a sufficient flexure of said joint may be adopted, and obviously the direction of flexure for such purpose may be on either side of a straight line between the fixed point and the point of connection to the type-bar when the latter is in its normal position. Thus in a front-stroke machine wherein a flexing connection is or may be arranged in a substantially horizontal line the joint between the two members thereof may be moved either downwardly or upwardly, according to the design or the structure of the machine.

The type-bars and their flexing connections are so arranged and related to each other that the rebound of the type-bars from their back-stops tends to produce a flexure of the flexible connection in a direction opposite to that which effects the excursion of the type-bar to the printing-point. A stop suitably arranged to resist the transmitted strain of such rebound serves to lock each type-bar in its normal position. In this organization, therefore, the locking of the type-bars is or may be effected independently of the key-lever or other device by means of which the touch of the operator upon the finger-piece is transmitted to the flexing connection to throw the type-bar to the printing-point. What has been termed the "flexing connection" may be an arrangement of links or other elemental members such as that described in my application filed April 26, 1901, Serial No. 57,588, wherein the means for flexing it is applied between the fixed point and the point of connection with the type-bar, or the front member may be a lever rocking about the fixed point and having one arm or member to which the rear link is flexibly connected and another arm or member to which the power for producing the flexure is applied.

In the accompanying drawings I have shown the invention applied in the form now best known to me to a front-stroke writing-machine.

Figures 1, 4:
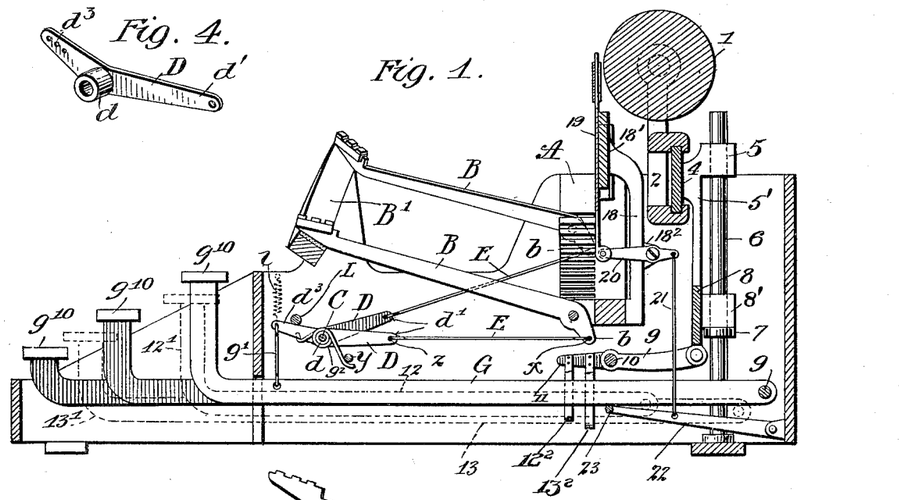
Figure 1 is a vertical longitudinal section showing so much of a type-writing machine as is deemed desirable to illustrate the invention.
Fig. 4, a detail perspective view showing a lever or member of one of the type-bar-actuating movements.
Figure 2:
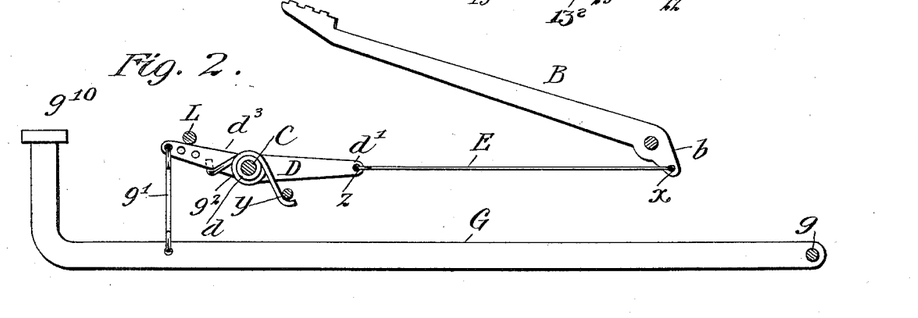
Fig. 2, an enlarged view showing in elevation a single type-bar and its actuating devices.
Figure 3:
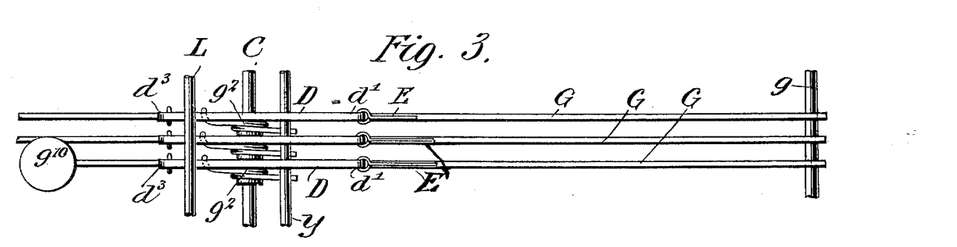
Fig. 3, a detail plan view showing three key-levers and parts of the connections for actuating the type-bars.

Referring to the construction shown in Fig. 1 and illustrated in detail in Figs. 2, 3, and 4, A is the type-bar segment, of usual construction, B the type-bars, pivoted therein, and B' the back-stop cushion or rest, upon which the bars normally lie. 1 indicates the platen. The heel or projection $b$ of each type-bar is connected at $x$ with a link E, extending forward and whose front end is hinged or flexibly connected at $z$ to a member D, which in the particular construction shown in Figs. 1 to 4 is a lever preferably formed with a hub $d$ in Fig. 4 and mounted to rock upon a horizontal rod C, supported in the side plates of the machine. Since the rod C is horizontal and it is preferred that the front arms $d^3$ of all the levers shall project forward at an equal angle from the axis C, the angular relation of the front and rear arms $d^3$ $d'$ usually varies according to the position of their respective type-bars in the segment. Thus, as appears from Fig. 1, where a center and end type-bar are shown, the flexing connection D E for the center bar is substantially horizontal, while that D E for the end bar is inclined upwardly toward the rear. A spring $g^2$ is coiled around the hub $d$ of each lever D, having one end hooked under the front arm $d^3$ of the lever and the other under a transverse rod $y$, the reaction of the spring tending to throw the arm $d^3$ of the lever up against a stop L, which is a transverse rod mounted in the side plates. Key-levers G, arranged under the connections D E, are pivoted at the rear of the machine upon a transverse bar $g$, and their upturned ends at the front of the machine are equipped with the usual finger-piece $g^{10}$. A link $g'$, preferably vertically arranged, as seen in Fig. 1, connects the front end $d^3$ of each lever D with its corresponding key-lever G. When a finger-piece $g^{10}$ is depressed, the end $d^3$ of its corresponding lever D is drawn down, and the joint or hinge $z$ of the flexing connection D E rises, and obviously the type-bar is thrown to the printing-point by a pull. When the type-bar returns to normal position against its back-stop B', all the parts assume again their normal position. The relation of the joint $z$, the link E, and the rear arm $d'$ of the lever D is then designedly such that the rebound of the type-bar due to impact with its back-stop tends to throw the joint $z$ downwardly; but this strain is positively resisted by the stop L, and consequently the bar is held in its normal position and prevented from rebounding, vibrating, or chattering on its back-stop. The platen 1 is mounted in vertical arms forming part of the frame 2, sliding laterally upon a cross plate or bar 4, forming part of a frame 5 5' 8 8', the parts 5 and 8' of which are apertured to slide upon vertical posts 6, the lowermost position of this frame being determined by collars 7, fixed on these posts. A rock-shaft 10, arranged below the type-bar segment, has rearwardly-projecting arms 9, extending under the transverse bar 8 of the platen-frame, and at the left-hand side of the machine has also a projecting arm 11, from which depend at different distances from the axis 10 straps $12^2$ $13^2$, engaged by shift-keys 12 13, having upturned ends 12' 13', equipped with finger-pieces, these keys being shown in dotted lines in Fig. 1 for the sake of clearness of illustration. Obviously when the shift-key 12 is depressed the transverse plate 4 is raised a given distance, and when the shift-key 13 is depressed it is raised a different distance. In this way, as is well understood, either of the three characters carried upon each of the type-bars may be printed from at will. The universal bar 23 is carried in the ends of three pivoted arms 22, arranged one in the middle and one each side of the machine and pivoted at their rear ends. The vertical link 21 extends from the center arm 22 to the rear end of a lever 20, pivoted in an arm 18, attached to the rear face of the segment A at its center and extending vertically and then curved toward the front of the machine. The upper end of the arm 18 carries or is formed with a vertical plate or block having guides or ways and in which reciprocates vertically a plate 18', attached to or forming part of a ribbon-carrier 19. Whenever a printing-key is depressed, the ribbon-carrier is raised to project the ribbon over the printing-point prior to the impact of the type against the platen.

Figure 5:
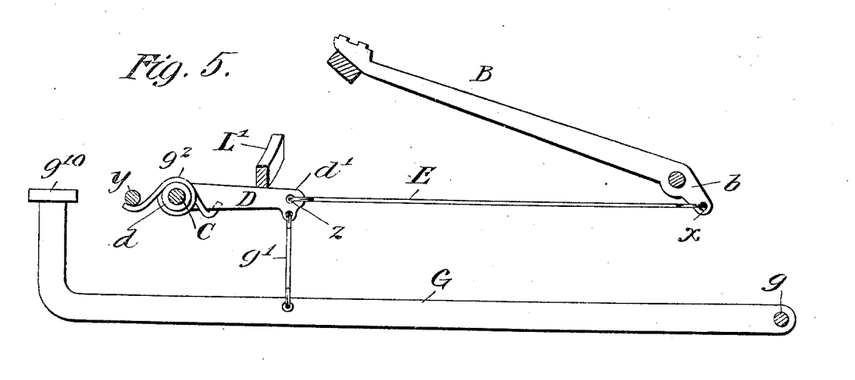
Figs. 5, 6, and 7 are respectively elevations, partly in section, each showing a type-bar and a modified form of actuating movement.

In Fig. 5 a similar arrangement is illustrated, except that there the member D is a link to the end $d'$ of which the front end of the link E is connected at $z$ by a hinge or flexing joint, and below the joint $z$ is flexibly connected the link $g'$, extending downwardly to the key-lever G. The spring $g^2$ here, however, tends normally to raise the member D against the stop L' in front of the fixed point or axis C. It is contemplated in this construction that the angle at which the connection D E extends rearwardly to its type-bar shall, as in Fig. 1, vary with the position of the type-bar in the segment. Consequently the stop L', which is shown as a continuous transverse bar, is segmental, and of course the lengths of the links $g'$ must correspondingly vary. The arrangement and relation of the type-bar and connection D E with reference to the stationary axis C is such that a strain or upward tendency of the head of the type-bar after coming against its back-stop will tend to move the joint $z$ of the connection D E upwardly, and as this movement is positively resisted by the stop L' the type-bar is locked upon its back-stop or rest.

Figures 6, 8:
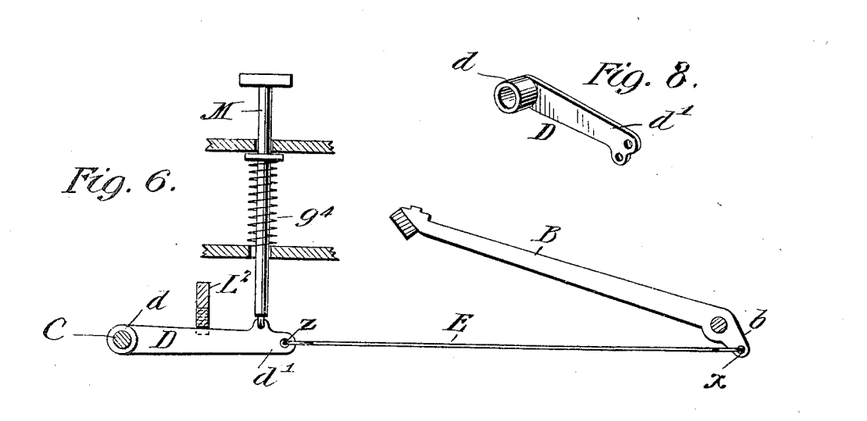
Fig. 8, a detail perspective view showing one of the parts of a type-bar movement different from that illustrated in Fig. 4.

In Fig. 6 an arrangement very similar to that shown in Fig. 5 is illustrated. Here, however, the transverse stop bar or plate $L^2$ instead of being, strictly speaking, segmental in shape, is stepped or notched to permit the proper angular extension of the connections D E toward the rear. In this figure, however, instead of employing a key-lever a vertically-movable stem is flexibly connected with the member D, and the point of connection may be, as shown, in front of the joint $z$. This stem (marked M) is equipped with the usual finger-pieces and moves vertically in suitably-apertured guide-plates, as is well understood, and between the plates and the collar on the stem is interposed a coiled spring $g^4$, the reaction of which tends to lift the stem and also the connection D E, the movement being limited by the stop-plate $L^2$. Any movement of the type-bar head from its back-stop tends to throw the joint upward; but the strain is resisted by the stop-plate $L^2$, and consequently the type-bar is locked in position except when the finger-piece is depressed to throw it to the printing-point.

Figure 7:
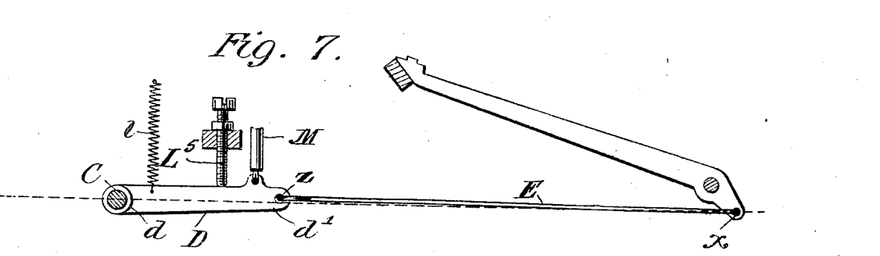

In Fig. 7 an arrangement in all substantial respects the same as that in Fig. 6 is illustrated. Here, however, in lieu of the notched stop-plate $L^2$ a transverse bar or plate is provided, and in it are mounted a series of stop-screws $L^5$, each of which is capable of independent adjustment. The dotted line extending horizontally through this figure passes through the center of the axis C and through the center of the joint $x$ between E and the type-bar; but the hinge-joint $z$ lies somewhat above it. This illustrates the arrangement which is preferably adopted to insure the movement of the connection D E when the type-bar tends to rebound from its rest or back-stop in such direction (upwardly, as here shown) that it would be positively resisted by the stop. A coiled spring $l$, applied to D, tends to draw it against the stop $L^5$. Aside from this arrangement, however, the application of a spring, as $g^2$, $g^4$, and $l$, directly to the flexing connection D E, and particularly to the member D, insures a tendency of the joints $z$ to move in the locking direction whenever the type-bar tends to move from its back-stop for any reason other than the depression of its finger-piece.

Figure 9:
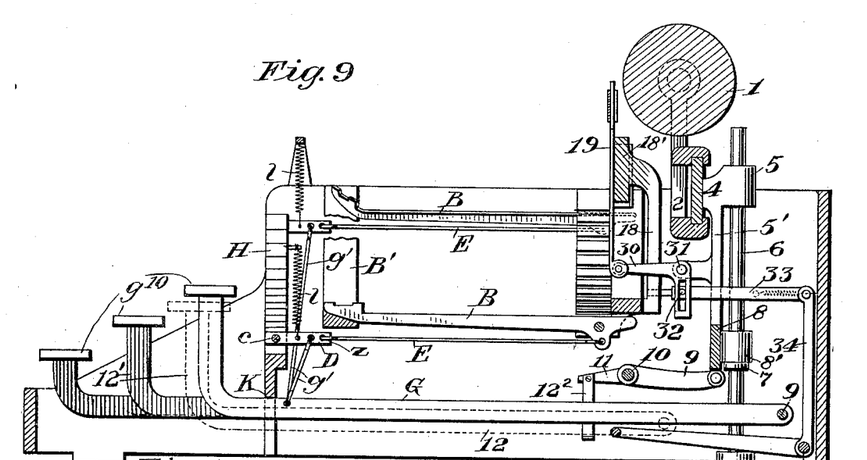
Fig. 9, a vertical longitudinal section showing a modification of the construction shown in Fig. 1.
Figure 10:
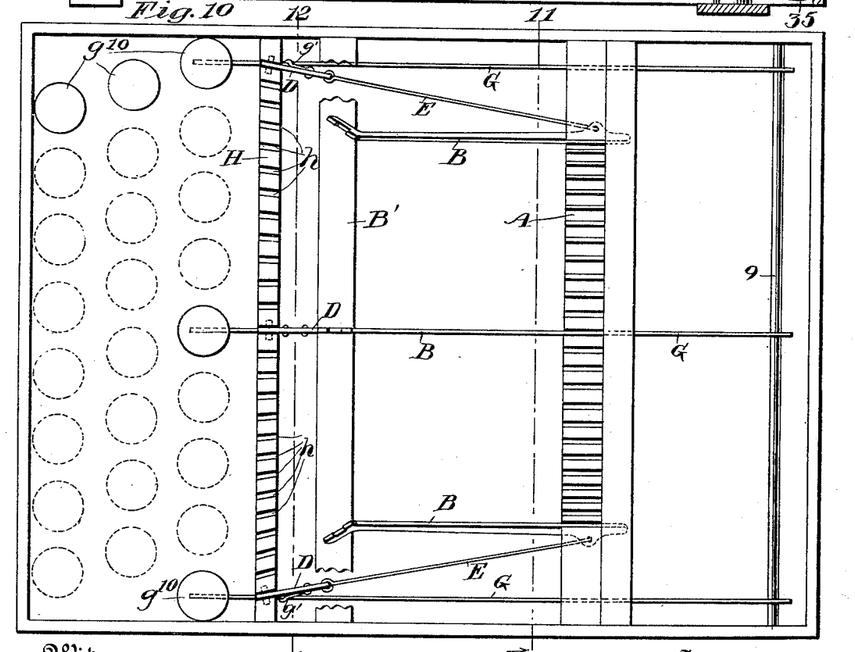
Fig. 10, a plan view illustrating the organization shown in Fig. 9.
Figure 11:
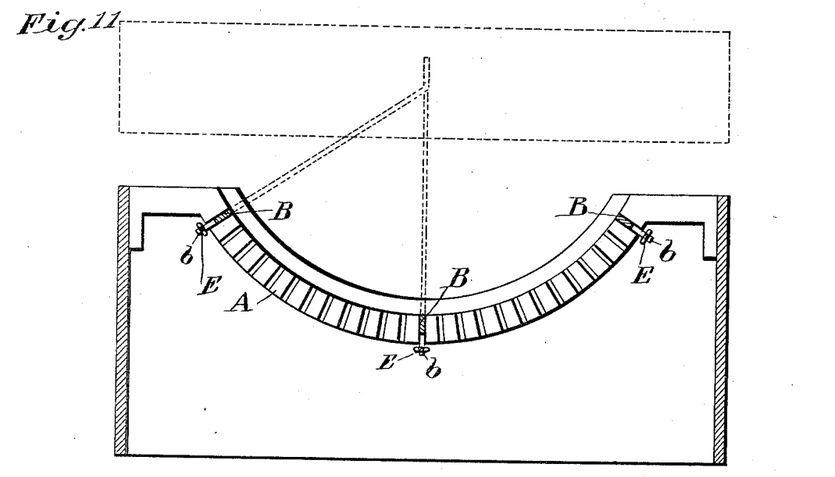
Fig. 11, a transverse section taken just in front of the type-bar segment on the line 11 11 and indicating merely the central and end type-bars, the platen, the positions of the type-bars at the time of printing being indicated by dotted lines.
Figure 12:
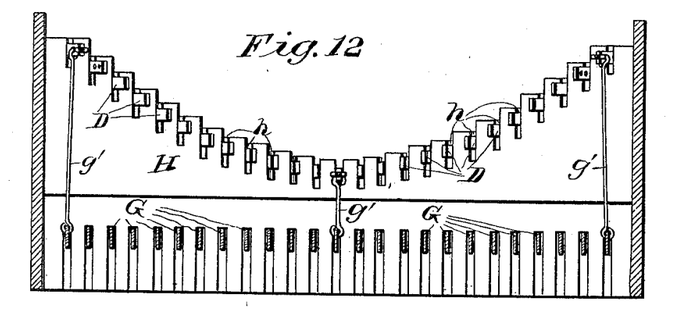
Fig. 12, a transverse section on the line 12 12 of Fig. 10, looking in the direction of the arrow.

In Figs. 9 to 15, inclusive, a machine of a somewhat-different general organization is disclosed. Parts corresponding substantially to those in Fig. 1 are marked with the same reference letters and numerals. In the modified construction, however, the type-bars when at rest lie in substantially horizontal lines, and each flexing connection D E is also horizontally disposed. For the purpose of such a general arrangement there is mounted in front of the back-stop B' a slotted segmental plate H, the slots $h$ in which on each side of the one or more slots at the center and in the construction shown on each side of the five slots at the center in Fig. 10 and on each side of the center slot in Fig. 11 are inclined toward the center line of the machine. This radial arrangement of the slots appears clearly in Fig. 10 and is adopted for the purpose of obtaining a favorable relation as regards pull between each type-bar and its actuating connection D E. The curve of the plate H is shown as having a somewhat larger radius than that of the type-bar segment, and consequently extends beyond the segment at each side of the machine. It will be observed that the several axes of the front links are arranged in a space of greater transverse width than that occupied by the type-bar segment and that those at the sides of the central ones are placed at varying inclinations to a vertical longitudinal plane, the inclination increasing toward the ends of the series. In the slots of the plate H are pivoted the members D of the several flexing connections. This element is shown as an oblong flat plate pivoted at c and having three apertures. The first one in rear of the plate H may serve for the connection of the spring l, the next one for the connection of the link g', and the third receives the eye on the end of the link E to form the flexing or hinge joint z. The link g' in this instance is inclined toward the front of the machine. Of course it might be vertical or might be set at any other appropriate inclination than that shown. Owing to the arrangement of the connections D E on parallel lines, but at different heights, they are arranged in a segmental or trough-like formation, and consequently the links g', extending from the key-levers G, increase in length successively according to the position or the elevation of the member D in the segment H. The mode of operation is the same as has already been described, as is also the general construction. There are, however, minor differences of structure. For instance, the stop that locks the connection D E to hold the type-bar on its rest is here afforded by abutment of the key-lever against the top wall K of its slot in the frame-plate of the machine, which in this construction may be an integral part of the plate H.

In Figs. 9 and 10 the type-bars are shown as each having but two characters, and consequently a correspondingly greater number of bars must be employed than is required in the construction of Fig. 1, and but one shift of the platen is requisite. This shift is afforded by the same construction illustrated in Fig. 1—namely, by the shift-lever 12, link or strap 12², radial arm 11, rock-shaft 10, and rearwardly-projecting arms 9.

The construction of Fig. 9 differs from that of Fig. 1 in respect to the manipulation or behavior of the ribbon-carrier, as follows: The ribbon support or vibrator 19 is pivotally mounted in the horizontal arm of a bell-crank lever 30, pivoted at 31 in a post or lug projecting forwardly from the part 5' of the carriage-frame. The downwardly-extending arm of the bell-crank is slotted, and in the slot plays a pin 32 on an arm 33, the reduced end of which slides in an aperture in the part 18 and the rear end of which is jointed to the upper end of an arm 34, extending vertically from the rock-shaft 35 of the universal bar. When the platen is shifted, the ribbon-vibrator 19 of course moves with it, and the ribbon is therefore maintained in normal position to the platen. When a key-lever is depressed and acts upon the universal bar 23, the bell-crank lever is rocked and vibrates the ribbon-carrier.

Figure 13:
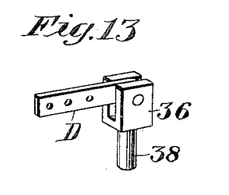
Figs. 13, 14, and 15 show different ways of mounting the front members of the flexing connections.
Figure 14:
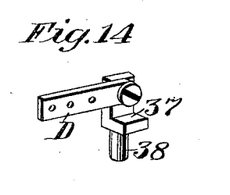
Figure 15:
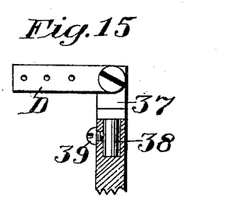

Figs. 13, 14, and 15 show different ways of mounting and supporting the members D in an organization the same or similar to that shown in Figs. 9 and 10. Here it is contemplated that the U-piece or yoke 36 or the L-piece or bracket 37, in which the member D is pivoted, shall have extending downwardly from it a post 38, adapted to be seated in a socket in a segmental plate or frame-piece corresponding with H and be clamped in adjusted position by a set-screw 39 or otherwise.

Figure 16:
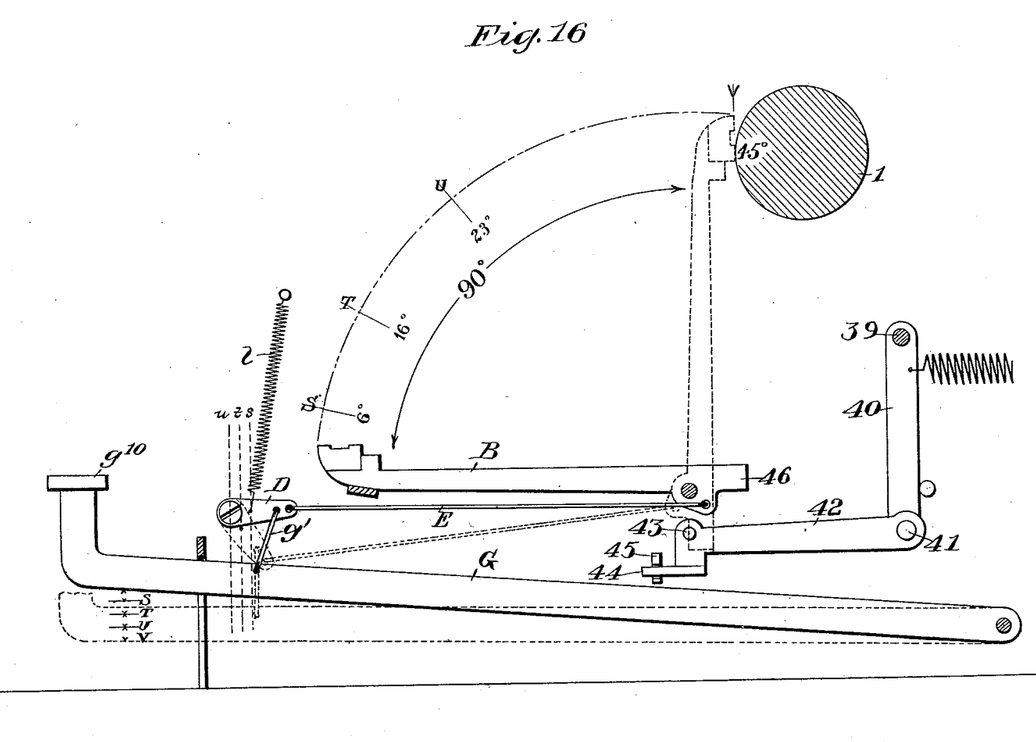
Fig. 16 is a view illustrating a platen, type-bar-actuating devices, and a scale showing the acceleration of the type-bar during its excursion through an arc of ninety degrees or thereabouts from the normal position of rest to the printing-point on the platen.

In Fig. 16 a universal-bar construction differing from that already described is shown. The essential parts for illustrating the mode of operating it are shown. It has not been deemed essential to show or describe the mode in which the movement of the universal bar is utilized to control the carriage. This construction of universal bar contemplates that the ribbon be carried and vibrated in some other way which is well known in the art than the ways shown in Figs. 1 and 9.

In Fig. 16 the universal-bar construction is as follows: On a transverse shaft 39 is attached a depending arm 40, lying in the center line of the machine and connected at its lower end to a rod 41, extending across the machine and carrying several forwardly-projecting arms 42, through the forward ends of which passes a rod 43. The arms 42 and rod 43 are to be arranged in a segmental curve below and conforming to a curve passing through the pivots of the type-bars. From the bottom of the forward end of each arm 42 there is a horizontal forwardly-projecting pin, lug, or plate 44, sliding and guided in an aperture in a transverse plate 45. Each type-bar is formed with a projection 46, extending rearwardly and beyond the point of attachment of the link E to the heel of the type-bar. When a type-bar moving to the printing-point has traversed part of the distance, the projection 46 thereon strikes the rod 43 a hammer-like blow, and thereby actuates the universal bar. A universal-bar construction of this general character and of the same mode of operation is shown in the application of Edward B. Hess and Lewis C. Myers, Serial No. 81,886, filed November 11, 1901, wherein the subject-matter is broadly claimed. The general arrangement of flexing connections D E and type-bars indicated in Fig. 16 is the same as that disclosed in Figs. 9 and 10. The type-bar is thrown through an arc of ninety degrees or thereabout, and in Fig. 16 a scale has been laid off, which illustrates the progressive acceleration of the type-bar during its excursion to the printing-point. A depression of the key-lever one-quarter of its depth—namely, to the point indicated by the line S—starts the type-bar in motion and moves it through six degrees. During the next quarter of depression to the line marked T the bar moves through sixteen degrees. The third quarter of depression to the line marked U moves the type-bar through twenty-three degrees farther, the three-quarter depression having carried the type-bar through a total of forty-five degrees. The remaining forty-five degrees for the last quarter of depression to the line indicated by V carries the type-bar through the remaining forty-five degrees to the printing-point. This acceleration of movement of the type-bar is due to the decreasing leverage of the member D as it travels down and around its fixed axis of motion. Obviously the initial touch of the finger-piece is very light or soft and the resistance it opposes to the finger of the operator increases gradually. In connection with this matter of touch of the finger-piece the spring $l$, applied to the member D, performs an additional desirable function. As will be seen from Fig. 16, as the member D is put into motion about its fixed axis and the type-bar commences to move the tension of the spring is at a minimum, but the strain exerted by it has a maximum leverage on the member D. As the member descends in rocking about its fixed axis the spring is of course distended and its tension correspondingly increased; but the leverage on the member D decreases by reason of the movement of the point of attachment of the spring toward the vertical plane in which the fixed axis lies. This is illustrated by the vertical dotted lines $s\ t\ u$, that $s$ passing through the point of attachment of the spring to the member D, and that $t$ through the same point when the key-lever is completely depressed, and that $u$ through the fixed axis. This arrangement materially improves the touch of the finger-piece — that is to say, while the touch becomes harder during the finger-piece depression, because of the decreasing leverage of the member D, the full resistance of the increased tension of the spring $l$ is not added to the load, because the leverage of the spring upon the part D decreases as it swings around its stationary axis.

It will be obvious to those skilled in the art that the invention herein disclosed may be embodied in machines differing from that shown in the drawings.

A flexing type-bar-actuating connection having the general structure and mode of operation herein described and shown in Figs. 5, 6, 7, 9, and 10 irrespective of the type-bar-locking feature is broadly claimed in my application hereinbefore mentioned, Serial No. 57,588, filed April 26, 1901.

It will be observed that the link E is connected to its type-bar by a loose or universal joint and that the flexing or hinge connection between it and the front member D is of like character, as are also the connections between the link $g'$, link or member D, and key-lever G. This construction affords a desirable degree of flexibility of special importance in connection with the operation of those type-bars at or near the ends of the segment.

I claim as my invention—

1. The combination of a pivoted type-bar, a back-stop upon which it normally lies, a type-bar-actuating connection adapted to be flexed up and down or transversely to the horizontal plane of the machine and comprising two members arranged end to end and united by a flexing or hinge joint, locked against flexure in one direction to resist tendency of the type-bar to rebound from its back-stop and free to flex in the opposite direction to throw the type-bar to the printing-point.

2. The combination of a pivoted type-bar, a back-stop upon which it normally lies, a type-bar-actuating connection adapted to be flexed up and down or transversely to the horizontal plane of the machine and comprising two members arranged end to end and united by a flexing joint, a stop for positively locking said connection against flexure in one direction to resist tendency of the type-bar to rebound from its back-stop, a finger-piece and means by which on the depression of the finger-piece said connection is flexed in the opposite direction to throw the type-bar to the printing-point.

3. The combination of a pivoted type-bar, a back-stop upon which it normally lies, a type-bar-actuating connection adapted to be flexed up and down or transversely to the horizontal plane of the machine and comprising two members arranged end to end and united by a flexing joint, a stop applied directly to one of said members for positively locking said connection against flexure in one direction to resist tendency of the type-bar to rebound from its back-stop, a finger-piece and means by which on the depression of the finger-piece said connection is flexed in the opposite direction to throw the type-bar to the printing-point.

4. The combination of a pivoted type-bar, a type-bar-actuating connection comprising two members united by a flexing joint one being connected to the type-bar and the other rocking about a stationary axis, a stop for locking said connection against flexure in one direction to resist the rebound of the type-bar after it has completed its excursion from the printing-point, a finger-piece and means for flexing the connection in the opposite direction on the depression of the finger-piece to throw the type-bar to the printing-point.

5. The combination of a pivoted type-bar, a type-bar-actuating connection comprising two members united by a flexing joint, one being connected to the type-bar and the other rocking about a stationary axis, the flexing joint between the two members being nearer the stationary axis than the point of connection with the type-bar, a stop for locking said connection against flexure in one direction to resist the rebound of the type-bar after it has completed its excursion from the printing-point, a finger-piece and means for flexing the connection in the opposite direction on the depression of the finger-piece to throw the type-bar to the printing-point.

6. The combination of a pivoted type-bar, a type-bar-actuating connection comprising two members united by a flexing joint, one being connected to the type-bar and the other rocking about a stationary axis, a stop applied directly to the member rocking about the stationary axis for locking said connection against flexure in one direction to resist the rebound of the type-bar after it has completed its excursion from the printing-point, a finger-piece and means for flexing the connection in the opposite direction on the depression of the finger-piece to throw the type-bar to the printing-point.

7. The combination of a pivoted type-bar, a type-bar-actuating connection comprising two links arranged end to end and united by a hinge-joint, one of the links being operatively connected to the type-bar, a stationary axis about which the other link rocks, a stop for limiting the flexure of the connection in one direction to resist rebound of the type-bar after it has completed its excursion from the printing-point, a finger-piece and means for, on the depression of the finger-piece, flexing the connection in the opposite direction to throw the type-bar to the printing-point.

8. The combination of a pivoted type-bar, a type-bar-actuating connection comprising two links of unequal length arranged end to end and united by a hinge-joint and one of the links being operatively connected to the type-bar, a stationary axis about which the other link rocks, a stop for limiting the flexure of the connection in one direction to resist rebound of the type-bar after it has completed its excursion from the printing-point, a finger-piece and means for, on the depression of the finger-piece, flexing the connection in the opposite direction to throw the type-bar to the printing-point.

9. The combination of a pivoted type-bar normally lying toward the front of the machine, an actuating connection arranged under the type-bar and comprising two members united by a flexing joint and one of which is operatively connected to the type-bar, a fixed axis about which the other member rocks, a stop for limiting flexure of the connection in one direction to resist tendency of the type-bar to rebound after completing its excursion from the printing-point, a finger-piece and means on the depression of the finger-piece for flexing the connection in the opposite direction to throw the type-bar to the printing-point.

10. The combination of a pivoted type-bar normally lying toward the front of the machine, an actuating connection arranged under the type-bar and comprising two members united by a flexing joint and one of which is operatively connected to the type-bar, a fixed axis about which the other member rocks, a stop for limiting flexure of the connection in one direction to resist tendency of the type-bar to rebound after completing its excursion from the printing-point, a horizontally-disposed key-lever arranged beneath the flexing connection and means whereby on the depression of the finger-piece said connection is flexed in the opposite direction to throw the type-bar to the printing-point.

11. The combination of a pivoted type-bar normally lying toward the front of the machine, an actuating connection arranged under the type-bar and comprising two members united by a flexing joint and one of which is operatively connected to the type-bar, a fixed axis about which the other member rocks, a stop applied directly to the member rocking about the stationary axis for limiting flexure of the connection in one direction to resist tendency of the type-bar to rebound after completing its excursion from the printing-point, a horizontally-disposed key-lever arranged beneath the flexing connection and means whereby on the depression of the finger-piece said connection is flexed in the opposite direction to throw the type-bar to the printing-point.

12. The combination of a pivoted type-bar, an actuating connection comprising two members united by a flexing joint one of which is operatively connected to the type-bar, a fixed axis about which the other member rocks, a stop for positively locking the connection against flexure in one direction to resist rebound of the type-bar, a spring acting directly upon the member rocking about the stationary axis and tending to flex the connection in said direction, a finger-piece and means on the depression of the finger-piece for flexing the connection in the opposite direction to throw the type-bar to the printing-point.

13. The combination of a pivoted type-bar, an actuating connection comprising two members united by a flexing joint one of which is operatively connected to the type-bar, a fixed axis about which the other member rocks, a stop for positively locking the connection against flexure in one direction, a key-lever and a connection between the key-lever and the type-bar-actuating connection for flexing it in the opposite direction to throw the type-bar to the printing-point.

14. The combination of a pivoted type-bar, a back-stop upon which it normally lies, a type-bar-actuating connection, comprising two members united by a flexing joint, a stop for positively locking said connection against flexure in one direction to resist tendency of the type-bar to rebound from its back-stop, a finger-piece and means actuated thereby and applied directly to the type-bar-actuating connection between its ends for flexing it in the opposite direction to throw the type-bar to the printing-point.

15. The combination of a pivoted type-bar, a back-stop upon which it normally lies, a type-bar-actuating connection, comprising two members united by a flexing joint, a stop applied directly to one of said members for positively locking said connection against flexure in one direction to resist tendency of the type-bar to rebound from its back-stop, a finger-piece and means actuated thereby and applied directly to the type-bar-actuating connection between its ends for flexing it in opposite direction to throw the type-bar to the printing-point.

16. The combination of a pivoted type-bar, a type-bar-actuating connection comprising two members united by a flexing joint one being connected to the type-bar and the other rocking about a stationary axis, a stop for locking said connection against flexure in one direction to resist the rebound of the type-bar after it has completed its excursion from the printing-point, a finger-piece and means actuated thereby and applied directly to the type-bar-actuating connection between the stationary axis and the point of connection with the type-bar for flexing it in the opposite direction to throw the type-bar to the printing-point.

17. The combination of a pivoted type-bar, a type-bar-actuating connection comprising two members united by a flexing joint, one being connected to the type-bar and the other rocking about a stationary axis, the flexing joint between the two members being nearer the stationary axis than the point of connection with the type-bar, a stop for locking said connection against flexure in one direction to resist the rebound of the type-bar after it has completed its excursion from the printing-point, a finger-piece and means actuated thereby and applied directly to the type-bar-actuating connection between the stationary axis and the point of connection with the type-bar for flexing it in the opposite direction to throw the type-bar to the printing-point.

18. The combination of a pivoted type-bar, a type-bar-actuating connection comprising two members united by a flexing joint, one being connected to the type-bar and the other rocking about a stationary axis, a stop applied directly to the member rocking about the stationary axis for locking said connection against flexure in one direction to resist the rebound of the type-bar after it has completed its excursion from the printing-point, a finger-piece and means actuated thereby and applied directly to the type-bar-actuating connection between the stationary axis and the point of connection with the type-bar for flexing it in the opposite direction to throw the type-bar to the printing-point.

19. The combination of a pivoted type-bar, a type-bar-actuating connection comprising two links arranged end to end and united by a hinge-joint, one of the links being operatively connected to the type-bar, a stationary axis about which the other link rocks, a stop for limiting the flexure of the connection in one direction to resist rebound of the type-bar after it has completed its excursion from the printing-point, a finger-piece and means actuated thereby and applied directly to the type-bar-actuating connection between the stationary axis and the point of connection with the type-bar for flexing it in the opposite direction to throw the type-bar to the printing-point.

20. The combination of a pivoted type-bar, a type-bar-actuating connection comprising two links of unequal length arranged end to end and united by a hinge-joint and one of the links being operatively connected to the type-bar, a stationary axis about which the other link rocks, a stop for limiting the flexure of the connection in one direction to resist rebound of the type-bar after it has completed its excursion from the printing-point, a finger-piece and means actuated thereby and applied directly to the type-bar-actuating connection between the stationary axis and the point of connection with the type-bar for flexing it in the opposite direction to throw the type-bar to the printing-point.

21. The combination of a pivoted type-bar normally lying toward the front of the machine, an actuating connection arranged under the type-bar and comprising two members united by a flexing joint and one of which is operatively connected to the type-bar, a fixed axis about which the other member rocks, a stop for limiting flexure of the connection in one direction to resist tendency of the type-bar to rebound after completing its excursion from the printing-point, a finger-piece and means actuated thereby and applied directly to the actuating connection between the stationary axis and the point of connection with the type-bar for flexing it in the opposite direction to throw the type-bar to the printing-point.

22. The combination of a pivoted type-bar normally lying toward the front of the machine, an actuating connection arranged under the type-bar and comprising two members united by a flexing joint and one of which is operatively connected to the type-bar, a fixed axis about which the other member rocks, a stop for limiting flexure of the connection in one direction to resist tendency of the type-bar to rebound after completing its excursion from the printing-point, a horizontally-disposed key-lever arranged beneath the flexing connection and a connection between the key-lever and the actuating connection between the fixed axis and the point of connection to the type-bar for flexing it in the opposite direction to throw the type-bar to the printing-point.

23. The combination of a pivoted type-bar normally lying toward the front of the machine, an actuating connection arranged under the type-bar and comprising two members united by a flexing joint and one of which is operatively connected to the type-bar, a fixed axis about which the other member rocks, a stop applied directly to the member rocking about the stationary axis for limiting flexure of the connection in one direction to resist tendency of the type-bar to rebound after completing its excursion from the printing-point, a horizontally-disposed key-lever arranged beneath the flexing connection and a connection between the key-lever and the actuating connection between the fixed axis and the point of connection with the type-bar for flexing it in the opposite direction to throw the type-bar to the printing-point.

24. The combination of a pivoted type-bar, an actuating connection comprising two members united by a flexing joint one of which is operatively connected to the type-bar, a fixed axis about which the other member rocks, a stop for positively locking the connection against flexure in one direction to resist rebound of the type-bar, a spring acting directly upon the member rocking about the stationary axis and tending to flex the connection in said direction, a finger-piece and means actuated thereby and applied directly to the actuating connection between the stationary axis and the point of connection with the type-bar for flexing it in the opposite direction to throw the type-bar to the printing-point.

25. The combination of a pivoted type-bar, an actuating connection comprising two members united by a flexing joint one of which is operatively connected to the type-bar, a fixed axis about which the other member rocks, a stop for positively locking the connection in the opposite direction, a key-lever and a connection between the key-lever and the actuating connection between the fixed axis and the point of connection of the type-bar for flexing it in the opposite direction to throw the type-bar to the printing-point.

26. The combination of a pivoted type-bar, its operating connection comprising two members united by a flexing joint, and one of which is operatively connected to the type-bar; a stationary axis about which the other rocks, the connection being arranged substantially in a straight line between the stationary axis and the point of connection with the type-bar; a stop locking the connection against flexure in one direction, to resist the tendency of the type-bar to rebound after it has completed its excursion from the printing-point; a finger-piece, and means, on the depression of the finger-piece, for flexing the connection in opposite direction, to throw the type-bar to the printing-point.

27. The combination of a pivoted type-bar, its operating connection comprising two members united by a flexing joint, and one of which is operatively connected to the type-bar; a stationary axis about which the other rocks, the connection being arranged substantially in a straight line between the stationary axis and the point of connection with the type-bar; a stop applied directly to the member rocking about the stationary axis, locking the connection against flexure in one direction, to resist the tendency of the type-bar to rebound after it has completed its excursion from the printing-point; a finger-piece, and means, on the depression of the finger-piece, for flexing the connection in opposite direction, to throw the type-bar to the printing-point.

28. The combination of a pivoted type-bar, its operating connection comprising two members united by a flexing joint, and one of which is operatively connected to the type-bar; a stationary axis about which the other rocks, the connection being arranged substantially in a straight line between the stationary axis and the point of connection with the type-bar; a stop locking the connection against flexure in one direction, to resist the tendency of the type-bar to rebound after it has completed its excursion from the printing-point; a spring normally tending to flex the connection in said direction; a finger-piece, and means, on the depression of the finger-piece, for flexing the connection in opposite direction, to throw the type-bar to the printing-point.

29. The combination of a pivoted type-bar normally lying toward the front of the machine; a type-bar-actuating connection comprising two members united by a flexing joint, and one of which is operatively connected to the type-bar; a stationary axis about which the other member rocks, the connection being disposed substantially in a straight line between said axis and the point of connection with the type-bar, but with the flexing joint slightly to one side of said line; a stop that locks said connection against further deflection from said straight line, to resist the tendency of the type-bar to rebound; a finger-piece, and means, on the depression of the finger-piece, for flexing said connection on the other side of said straight line, to throw the type-bar to the printing-point.

30. The combination of a pivoted type-bar normally lying toward the front of the machine; a type-bar-actuating connection comprising two members united by a flexing joint, and one of which is operatively connected to the type-bar; a stationary axis about which the other member rocks, the connection being disposed substantially in a straight line between said axis and the point of connection with the type-bar, but with the flexing joint slightly to one side of said line; a stop that locks said connection against further deflection from said straight line, to resist the tendency of the type-bar to rebound; a spring tending to hold said connection in its normal position; a finger-piece, and means, on the depression of the finger-piece, for flexing said connection on the other side of said straight line, to throw the type-bar to the printing-point.

31. The combination of a pivoted type-bar normally lying toward the front of the machine; a type-bar-actuating connection comprising two members united by a flexing joint, and one of which is operatively connected to the type-bar; a stationary axis about which the other member rocks, the connection being disposed substantially in a straight line between said axis and the point of connection with the type-bar, but with the flexing joint slightly to one side of said line; a stop that locks said connection against further deflection from said straight line, to resist the tendency of the type-bar to rebound; a spring applied directly to the member rocking about the stationary axis, and tending to hold the connection in its normal position; a finger-piece, and means, on the depression of the finger-piece, for flexing said connection on the other side of said straight line, to throw the type-bar to the printing-point.

32. The combination of a pivoted type-bar, normally lying toward the front of the machine; a type-bar-actuating connection arranged under the type-bar and comprising two links united by a flexing joint, and one of which is operatively connected to the type-bar; a stationary axis about which the other link rocks, the connection being arranged substantially in a straight line between said axis and the point of connection with the type-bar, but with the flexing joint to one side of said line; a stop locking the connection against further flexure on the same side of the line; a finger-piece, and means, actuated by the finger-piece and connected to said connection between the stationary axis and the type-bar, for flexing the connection on the opposite side of said line, to throw the type-bar to the printing-point.

33. The combination of a pivoted type-bar, normally lying toward the front of the machine; a type-bar-actuating connection arranged under the type-bar and comprising two links united by a flexing joint, and one of which is operatively connected to the type-bar; a stationary axis about which the other link rocks, the connection being arranged substantially in a straight line between said axis and the point of connection with the type-bar, but with the flexing joint to one side of said line; a stop locking the connection against further flexure on the same side of the line; a spring applied directly to the link rocking about the stationary axis, and tending to hold the connection in its normal position; a finger-piece, and means, actuated by the finger-piece and connected to said connection between the stationary axis and the type-bar, for flexing the connection on the opposite side of said line, to throw the type-bar to the printing-point.

34. The combination of a pivoted type-bar, normally lying toward the front of the machine; a type-bar-actuating connection arranged under the type-bar and comprising two links united by a flexing joint, and one of which is operatively connected to the type-bar; a stationary axis about which the other link rocks, the connection being arranged substantially in a straight line between said axis and the point of connection with the type-bar, but with the flexing joint to one side of said line; a stop locking the connection against further flexure on the same side of the line; a key-lever arranged below said connection, and means interposed between the key-lever and said connection at a point between the type-bar and the stationary axis for, on the depression of the key-lever, flexing said connection on the other side of said line, to throw the type-bar to the printing-point.

35. The combination of a pivoted type-bar, normally lying toward the front of the machine; a type-bar-actuating connection arranged under the type-bar and comprising two links united by a flexing joint, and one of which is operatively connected to the type-bar; a stationary axis about which the other link rocks, the connection being arranged substantially in a straight line between said axis and the point of connection with the type-bar, but with the flexing joint to one side of said line; a stop locking the connection against further flexure on the same side of the line; a spring applied directly to the link rocking about the stationary axis, and tending to hold the connection in its normal position; a key-lever arranged below said connection, and means interposed between the key-lever and said connection at a point between the type-bar and the stationary axis for, on the depression of the key-lever, flexing said connection on the other side of said line, to throw the type-bar to the printing-point.

36. In a front-stroke or visible-writing machine, the combination of the type-bar segment, type-bars pivoted therein and normally lying toward the front of the machine; type-bar-actuating connections, one for each type-bar, each composed of two links united by a flexing joint, and one of which is operatively connected to its type-bar, a stationary axis toward the front of the machine about which the other link rocks, the several stationary axes being arranged in a space of greater transverse width than that occupied by the type-bar segment, and those at the sides of the central ones being placed at varying inclinations to a vertical longitudinal plane, the inclination increasing toward the ends of the series, so that the type-bar-actuating connections, as a whole, constitute a converging series; a stop for limiting flexure of each said connection in a direction to resist the strain of rebound of its type-bar; key-levers horizontally disposed beneath the type-bar-actuating connections, and means interposed between the key-levers and such connections to flex them in the opposite direction, to throw the type-bar to the printing-point.

37. In a front-stroke or visible-writing machine, the combination of the type-bar segment, type-bars pivoted therein and normally lying toward the front of the machine; type-bar-actuating connections, one for each type-bar, each composed of two links united by a flexing joint, and one of which is operatively connected to its type-bar, a stationary axis toward the front of the machine about which the other link rocks, the several stationary axes being arranged in a space of greater transverse width than that occupied by the type-bar segment, and those at the sides of the central ones being placed at varying inclinations to a vertical longitudinal plane, the inclination increasing toward the ends of the series, so that the type-bar-actuating connections, as a whole, constitute a converging series; a stop for limiting flexure of each said connection in a direction to resist the strain of rebound of its type-bar; key-levers arranged below the type-bar-actuating connections, and a device or link interposed between each key-lever and the corresponding type-bar-actuating connection, at a point in the latter intermediate the type-bar and the stationary axis.

38. In a front-stroke or visible-writing machine, the combination of the type-bar segment, type-bars pivoted therein and normally lying toward the front of the machine; type-bar-actuating connections, one for each type-bar, each composed of two links united by a flexing joint, and one of which is operatively connected to its type-bar, a stationary axis toward the front of the machine about which the other link rocks, the several stationary axes being arranged in a space of greater transverse width than that occupied by the type-bar segment, and those at the sides of the central ones being placed at varying inclinations to a vertical longitudinal plane, the inclination increasing toward the ends of the series, so that the type-bar-actuating connections, as a whole, constitute a converging series; a stop for limiting flexure of each said connection in a direction to resist the strain of rebound of its type-bar; a spring applied to one of the links and tending to hold the type-bar-actuating connection in its normal position, in which it locks the type-bar against rebound; key-levers horizontally disposed beneath the type-bar-actuating connections, and means interposed between the key-levers and such connections to flex them in the opposite direction, to throw the type-bar to the printing-point.

39. In a front-stroke or visible-writing machine, the combination of the type-bar segment, type-bars pivoted therein and normally lying toward the front of the machine; type-bar-actuating connections, one for each type-bar, each composed of two links united by a flexing joint, and one of which is operatively connected to its type-bar, a stationary axis toward the front of the machine about which the other link rocks, the several stationary axes being arranged in a space of greater transverse width than that occupied by the type-bar segment, and those at the sides of the central ones being placed at varying inclinations to a vertical longitudinal plane, the inclination increasing toward the ends of the series, so that the type-bar-actuating connections, as a whole, constitute a converging series; a stop for limiting flexure of each said connection in a direction to resist the strain of rebound of its type-bar; a spring applied to one of the links and tending to hold the type-bar-actuating connection in its normal position, in which it locks the type-bar against rebound; key-levers arranged below the type-bar-actuating connections, and a device or link interposed between each key-lever and the corresponding type-bar-actuating connection, at a point in the latter intermediate the type-bar and the stationary axis.

40. The combination of a pivoted type-bar, its actuating connection comprising two members united by a flexing joint, and one of which is operatively connected to the type-bar; a stationary axis about which the other rocks; a spring applied to the latter intermediate the stationary axis and flexing joint, and normally tending to deflect said joint to one side of a straight line between said axis and the point of connection with the type-bar; a stop for limiting movement in that direction to thereby lock the type-bar against rebound; a finger-piece, and means, on the depression of the finger-piece, for flexing said connection on the opposite side of the straight line, to throw the type-bar to the printing-point.

41. The combination of a pivoted type-bar, its actuating connection comprising two members united by a flexing joint, and one of which is operatively connected to the type-bar; a stationary axis about which the other rocks; a coiled spring applied to the latter intermediate the stationary axis and flexing joint, and normally tending to deflect said joint to one side of a straight line between said axis and the point of connection with the type-bar; a stop for limiting movement in that direction to thereby lock the type-bar against rebound; a finger-piece, and means, on the depression of the finger-piece, for flexing said connection on the opposite side of the straight line, to throw the type-bar to the printing-point.

42. In a front-stroke or visible-writing machine the combination of a pivoted type-bar normally lying toward the front of the machine; a horizontally-disposed key-lever arranged below the type-bar; a flexing type-bar-actuating connection intermediate the type-bar and key-lever, and extending between the heel of the type-bar and a stationary axis toward the front of the machine; a lock independent of the key-lever for limiting its flexure in a direction to resist rebound of the type-bar, and an operative connection between the key-lever and the type-bar-actuating connection to flex the latter in the opposite direction, to throw the type-bar to the printing-point.

43. In a front-stroke or visible-writing machine, the combination of a type-bar segment, a type-bar pivoted therein and normally lying toward the front of the machine; a flexing connection for operating the type-bar, comprising two members, one operatively connected with the type-bar, and the other rocking about an axis fixed in the frame of the machine, said connection being locked against movement in one direction relatively to said axis to lock the type-bar against rebound, and free to rock in the other direction to throw the type-bar to the printing-point.

44. In a visible-writing machine, the combination of a type-bar segment, type-bars pivoted therein, flexing connections, one for each type-bar, each comprising two members united by a hinge-joint, the rear one being operatively connected to the type-bar and the front one to a stationary axis, the assemblage of flexing connections converging from the front of the machine toward the type-bar segment and lying in a transverse curve or segment, means whereby the flexing connections are locked to prevent rebound of the type-bars from their back stops or rests and means for actuating the flexing connections to throw the type-bars to the printing-point.

45. In a visible-writing machine, the combination of a type-bar segment, type-bars pivoted therein, flexing type-bar-actuating connections disposed horizontally radially and in a transverse curve, means for locking them to prevent rebound of the type-bars from their back stops or rests and means for actuating them to throw the type-bars to the printing-point.

46. The combination of a pivoted type-bar, a flexing connection for actuating it comprising two members connected by a flexing joint, one of which is operatively connected to the type-bar and the other to a stationary axis about which it rocks and a spring acting to return the parts to normal position and so applied directly to the flexing connection that while its tension is increased during the excursion of the type-bar to the printing-point the leverage of its reactionary pull is decreased.

47. The combination of a pivoted type-bar, its actuating devices normally locked to prevent rebound of the type-bar from its rest and a spring so applied to the actuating devices that while its tension is increased during the excursion of the type-bar to the printing-point, the leverage of its reactionary pull is decreased.

48. The combination of a pivoted type-bar, its decreasing-leverage-actuating devices acting to impart an increasing acceleration to the type-bar and a spring coacting with said devices and so applied directly thereto that its tension is increased and the leverage of its pull decreased during the excursion of the type-bar to the printing-point.

49. The combination of a pivoted type-bar, its decreasing-leverage-actuating devices normally locked to prevent rebound of the type-bar from its back stop or rest and acting to impart an increasing acceleration to the type-bar and a spring coacting with said devices and so applied directly thereto that its tension is increased and the leverage of its pull decreased during the excursion of the type-bar to the printing-point.

50. The combination of a pivoted type-bar, a link connected thereto by a universal joint, means for actuating the link with a decreasing leverage to move it endwise and change its angular relation to the type-bar whereby the type-bar is thrown to the printing-point with an accelerating speed and a spring so applied to said devices that its tension is increased and its leverage decreased during the excursion of the type-bar to the printing-point.

51. The combination of a pivoted type-bar, a link connected thereto by a universal joint, means for actuating the link with a decreasing leverage to move it endwise and change its angular relation to the type-bar whereby the type-bar is thrown to the printing-point with an accelerating speed, means for locking the devices in normal position to resist and prevent rebound of the type-bar from its back stop or rest and a spring so applied to said devices that its tension is increased and its leverage decreased during the excursion of the type-bar to the printing-point.

52. The combination of a pivoted type-bar, its actuating devices comprising two members arranged end to end connected by a flexing joint, one operatively connected to the type-bar and the other rocking about a stationary axis, a link arranged transversely thereto, a key-lever for operating it to flex said joint in one direction to throw the type-bar to the printing-point and means for locking the joint against flexure in the opposite direction to thereby prevent rebound of the type-bar from its back stop or rest.

53. The combination of a pivoted type-bar, its horizontally-arranged actuating devices capable of moving upwardly and downwardly as the type-bar moves toward and from the printing-point and a stop to prevent movement vertically from the normal position and thereby lock the type-bar against its rest.

54. The combination of a pivoted type-bar, a link loosely connected therewith, a decreasing-leverage device acting to move the link endwise with a pull and at the same time change its angular position, a key-lever, a connection between the key-lever and the decreasing-leverage device, a spring whose reaction tends to hold the parts in normal position and the tension of which is increased but the leverage of its pull decreased during the depression of the key-lever and the consequent excursion of the type-bar to the printing-point and means for locking said link against strain of rebound of the type-bar from its rest.

55. In a front-stroke or visible-writing machine, the combination of the type-bar segment, type-bars pivoted therein, horizontally-arranged flexing type-bar-actuating connections, horizontally-arranged key-levers, vertically-arranged springs tending to urge the connections upwardly and locking-stops for preventing rebound of the type-bars from their rests and against which the springs tend normally to draw the connections.

56. In a front-stroke or visible-writing machine, the combination of a type-bar segment, type-bars pivoted therein and normally lying toward the front of the machine, flexible connections extending from the type-bars toward the front of the machine and horizontally and radially arranged, means for locking them against flexure to prevent rebound of the type-bars from their rests, springs for maintaining the lock and means for actuating the connections to throw the type-bars to the printing-point.

57. In a front-stroke or visible-writing machine, the combination of a type-bar segment, type-bars pivoted therein and normally lying toward the front of the machine, flexible connections extending from the type-bars toward the front of the machine and horizontally, radially and segmentally arranged, means for locking them against flexure to prevent rebound of the type-bars from their rests, springs for maintaining the lock and means for actuating the connections to throw the type-bars to the printing-point.

58. In a front-stroke or visible-writing machine, the combination of a series of type-bars arranged in a segment or curve and locked to prevent rebound from their back stops or rests, a series of flexing connections for operating the type-bars, correspondingly segmentally arranged at their rear ends and at their front ends rocking about fixed axes and means for unlocking the bars and throwing them to the printing-point on the depression of their corresponding finger-pieces.

59. In a front-stroke or visible-writing machine, the combination of type-bars arranged in a curve or segment and locked against rebound from their back stops or rests and each having multiple type or characters thereon, flexing connections each composed of two links placed end to end and united by a flexing joint and arranged substantially in the same horizontal plane, a platen and means for changing the relation between the type-bars and the platen.

60. In a front-stroke or visible-writing machine, the type-bars arranged in a curve or segment and locked against rebound from their back stops or rests, flexing connections connected thereto and each comprising a decreasing-leverage member attached to another member by a universal joint and both members lying in substantially the same horizontal plane, and means for actuating the flexing connections to throw the type-bars to the printing-point.

61. In a front-stroke or visible-writing machine, the combination of type-bars arranged in a curve or segment, flexing connections each attached at one end to its type-bar and at the other end to a fixed point or part in the machine and comprising a decreasing-leverage member, and a decreasing-leverage spring, the reaction of which tends to maintain the parts in normal position.

62. In a front-stroke or visible-writing machine, the combination of a pivoted type-bar, a link coupled therewith by a universal joint and subjected to tensile strain only on the actuation of the type-bar, a decreasing-leverage link or member connected with the first-named link by a universal joint, a third link or member arranged transversely to both of the other two links, means for locking the two first-named links to hold the type-bar against its back stop or rest and a key-lever on the depression of which the type-bar is unlocked and thrown to the printing-point.

63. In a writing-machine, the combination of a normally locked part to be actuated, a flexing actuating connection, comprising links hinged together at their adjacent ends extending between said part and a fixed point and adapted when flexed to actuate said part with a pull, a finger-piece, and a flexible connection between the finger-piece and said actuating connection, intermediate its fixed point and the part to be actuated.

64. In a writing-machine, the combination of a type-bar segment, normally locked type-bars pivoted therein and normally lying toward the front of the machine, flexing actuating connections, acting substantially as described, extending from and under the type-bars to fixed points at the front part of the machine, finger-pieces and connections between the finger-pieces and such actuating connections.

65. In a writing-machine, the combination of a platen, a type-bar segment, means for changing the relation of the platen and segment, normally locked type-bars pivoted in the segment and normally lying toward the front of the machine, flexing actuating connections, acting substantially as described, extending from and under the type-bars to fixed points at the front part of the machine, finger-pieces and flexible connections between the finger-pieces and such actuating connections.

66. In a writing-machine, the combination of a flexing connection extending from a normally locked movable part to be actuated to a fixed point, a link having its upper end connected to said flexing connection intermediate its ends, and an actuating device to which the lower end of the link is connected, the operation being substantially as described.

67. In a writing-machine, the combination of a flexing connection extending from a normally locked movable part to be actuated to a fixed point and comprising links united at their adjacent ends by a hinge-joint, a third link whose upper end is hinged to the flexing connection intermediate its ends and an actuating device to which the lower end of the link is connected, the operation being substantially as described.

68. In a writing-machine, the combination of a flexing connection extending from a normally locked movable part to be actuated to a fixed point and comprising two links united at their adjacent ends by a hinge-joint, a third link hinged at one end to the connection in line with said joint, and an actuating device by which the other end of the link is depressed, the operation of the flexing connection being substantially as described.

69. In a writing-machine, the combination of a normally locked pivoted type-bar, a flexing connection operatively connected at one end to the type-bar and at the other end to a fixed point and comprising two links united at their adjacent ends by a hinge-joint, a third link hinged at one end to the connection in line with said joint, and an actuating device by which the other end of the link is depressed, the operation of the flexing being substantially as described.

In testimony whereof I have hereunto subscribed my name.

EDWARD B. HESS.

Witnesses:
EDWARD C. DAVIDSON,
KATHARINE MACMAHON.